United States Patent [19]
Freund et al.

[11] 4,201,425
[45] May 6, 1980

[54] LOCKING DEVICE FOR ANTI-FRICTION BEARINGS WITH SPLIT INNER RING

[75] Inventors: Hans Freund, Schwebheim; Werner Kotzab, Schweinfurt, both of Fed. Rep. of Germany

[73] Assignee: SKF Kugellagerfabriken GmbH, Schweinfurt, Fed. Rep. of Germany

[21] Appl. No.: 928,248

[22] Filed: Jul. 26, 1978

[30] Foreign Application Priority Data

Aug. 6, 1977 [DE] Fed. Rep. of Germany ... 7724545[U]

[51] Int. Cl.² .............................................. F16C 43/00
[52] U.S. Cl. ........................ 308/236; 29/148.4 A; 29/724; 206/318; 308/196; 308/189 R
[58] Field of Search ............... 308/196, 197, 193, 195, 308/189 R, 212, 236; 206/318; 29/148.4 A, 724, 725

[56] References Cited

U.S. PATENT DOCUMENTS

| | | | |
|---|---|---|---|
| 2,069,569 | 2/1937 | Young | 308/212 |
| 2,215,134 | 9/1940 | Rehnberg | 206/318 |
| 2,312,615 | 3/1943 | Allen | 206/318 |

FOREIGN PATENT DOCUMENTS

| | | | |
|---|---|---|---|
| 1747260 | 4/1957 | Fed. Rep. of Germany | |
| 53989 | 1/1921 | Sweden | 308/196 |

*Primary Examiner*—Charles E. Frankfort
*Attorney, Agent, or Firm*—Eugene E. Renz, Jr.

[57] ABSTRACT

A locking device for maintaining the split inner ring of a bearing in assembled relation during shipment and handling prior to installation. The locking device is of generally rectangular shape and is made of a resilient elastically deformable material so that it is readily inserted and removed from the inner ring bore. When seated in place it exerts a clamping action in a radial direction by spring action and contacts in the bore of both inner ring parts of the bearing.

10 Claims, 12 Drawing Figures

U.S. Patent May 6, 1980 4,201,425
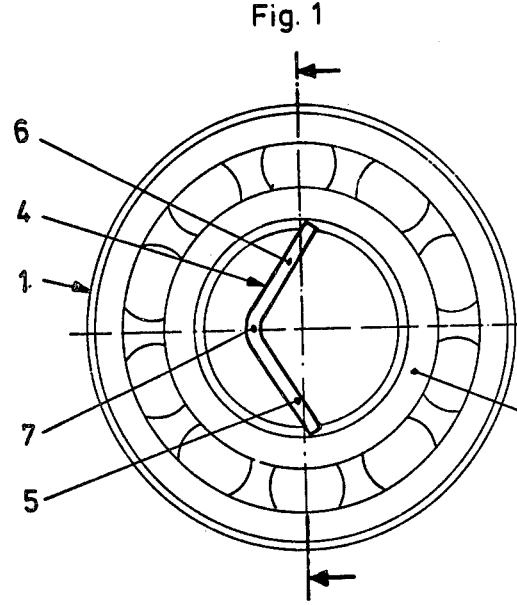
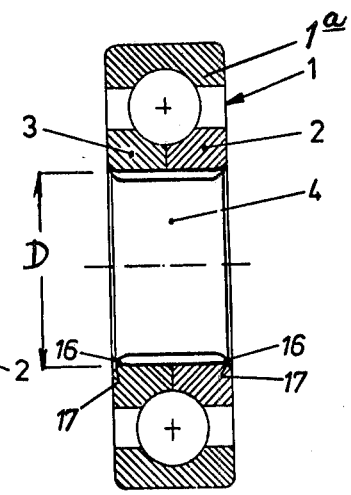
Fig. 1  Fig. 2
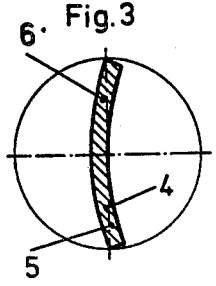 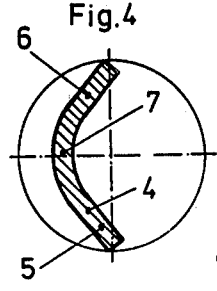 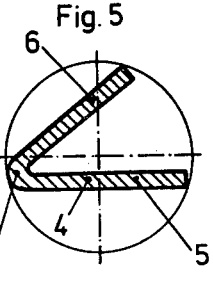 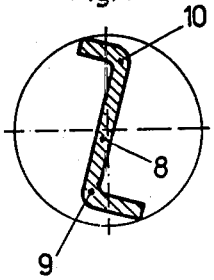
Fig. 3  Fig. 4  Fig. 5  Fig. 6
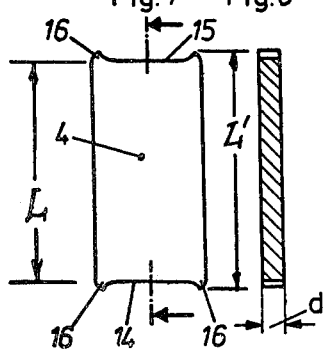 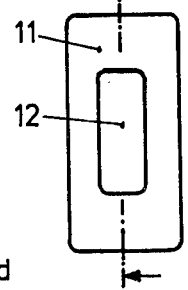 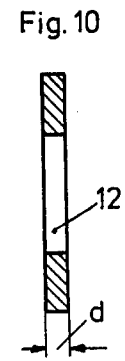  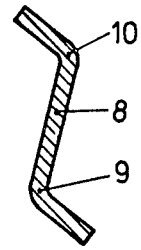
Fig. 7  Fig. 8  Fig. 9  Fig. 10  Fig. 11  Fig. 12

4,201,425

LOCKING DEVICE FOR ANTI-FRICTION BEARINGS WITH SPLIT INNER RING

BACKGROUND OF THE INVENTION

The present invention relates to anti-friction bearings, particularly of the type having a split inner ring assembly. More specifically the invention relates to a removeable safety lock for bearings of this type.

In anti-friction bearing assemblies having an inner ring split at right angle to the bearing axis, the parts of the inner ring must be matched to each other in order to ensure trouble-free operation of the bearing when installed. In the handling of bearings of this type prior to installation, particularly during shipment, there is the danger of separation of the inner ring parts with the consequent possibility of interchanging the split inner rings. Accordingly, it is necessary to provide some means for securing the inner ring parts during handling and shipment prior to installation.

Locking devices of this type are not new per se. For example, in accordance with one such prior art device shown in German Patent No. DT-Gbm 1 747 260, there is provided an elastic plastic bushing which has rib-like protuberances on the surface of its outer lining which elastically distort when inserted into the bore of the inner race rings. These bushings are relatively expensive to manufacture and it has been found that they are extremely difficult to remove by hand because of the tight locking engagement in the bore of the inner ring. In some instances, a sharp instrument is required to remove the bushing resulting in permanent damage. Consequently, the bushing is not reuseable.

The problem is thus to provide a locking device for bearings which is of relatively simple construction and can be manufactured economically and which nevertheless securely holds the assembled bearing parts together until final installation. Additionally, the safety lock should be relatively easy to dismantle without difficulty and be capable of reuse many times.

SUMMARY OF THE INVENTION

The present invention provides a locking device having these features. In accordance with the present invention the locking device comprises an essentially rectangular plate which is insertable in the bore of the bearing and clamped in a radial direction by spring action and which is made of a resilient material having good spring qualities, for example, plastic. The length of the plate is preferably greater than the diameter of the bore so that it sits in the bore under tension and holds the parts of the inner ring together. The plate may be provided with at least one opening or hole which adds to the capability of controlling the spring action. It also adds to the economy of the locking device by saving on material. In order to determine the "flex axis" of the plate-like safety lock in advance, the plate may have a variable cross section so that it tapers off to the middle adjacent the axis of the anti-friction bearing. In other forms of the invention illustrated, the cross section of the plate can be designed to be essentially L- or Z-shaped.

The edges of the plate member which are in contact with the bore of the inner ring parts may be designed to be smooth. It is, however, possible according to another feature of the invention to provide at the ends of the edges resting against the bore of the opposing inner ring parts radial protrusions or ears which engage with the rounds of the outer edges of the inner ring bore and thereby obtain an additional axial fixation of the inner ring parts. The locking device of the present invention may be designed so that a single device may be useful and adapted for bearings of different sizes by designing the width of the plate so that it is a multiple of the width of the smallest bearing size and in this event will span and grip the opposing rings of a wide variety of bearing sizes.

BRIEF DESCRIPTION OF THE DRAWING

These and other objects of the present invention and the various features and details of the construction and use of a safety portable locking device in accordance with the present invention are hereinafter more fully set forth with reference to the accompanying drawings wherein:

FIG. 1 is a side elevational view of a radial ball bearing with split inner ring and a portable safety locking device in accordance with the present invention mounted in the bore of the inner ring assembly;

FIG. 2 is a transverse sectional view taken on lines 1—1 of FIG. 1;

FIGS. 3 and 4 are schematic views of the locking device in place in the inner ring bore;

FIGS. 5 and 6 inclusive are sectional views of other embodiments of locking devices in accordance with the present invention;

FIG. 7 is a plan view of a locking device in accordance with the present invention;

FIG. 8 is a sectional view taken on lines 7—7 of FIG. 7;

FIG. 9 is a plan view of a further embodiment of locking device in accordance with the present invention;

FIG. 10 is a sectional view taken on lines 9—9 of FIG. 9;

FIG. 11 is a sectional view of still a further embodiment of locking device in accordance with the present invention; and FIG. 12 is a view of a locking device illustrated in FIG. 6.

DESCRIPTION OF THE PREFERRED EMBODIMENTS

Referring now to the drawings, there is illustrated in FIGS. 1 and 2 a conventional anti-friction bearing assembly 1 and a locking device in accordance with the present invention. The bearing illustrated is a radial ball bearing having a one-piece outer ring 1a, split inner rings 2 and 3 and a plurality of balls in the annular space between the rings. As is conventional the outer ring has a deep groove defining a raceway for the balls and each of the inner rings is provided with an arcuate segment defining together the inner raceway for the balls. Note that the outer edges of the inner ring adjacent the bore are rounded or bevelled as at 17.

In accordance with the present invention there is provided a locking device for maintaining the inner rings 2 and 3 in assembled relation during handling and shipment prior to installation of the bearing. The locking device illustrated is a generally rectangular plate member 4 made of a material having elastic properties, the length L of which is greater than the diameter D of the bore of the inner ring parts. The width of the plate member is preferably of a width equal to the axial length of the inner ring bore. By this arrangement when the plate 4 is slid into the bore, the plate elastically deforms and assumes in the present instance a bowed shape or one wherein the side legs 5 and 6 are angled obliquely toward the bore, whereby the vertex 7 of flexure lies approximately adjacent the center line of the plate 4.

Thus by reason of the spring tension in the radial direction, the inner ring parts are retained in the assembled relation shown. If desired, the plate may be provided adjacent at the ends of the opposing side edges 14 and 15 which are in contact with the bore of the inner ring parts with radial protrusions 16 at the corners of the plate which engage the rounds 17 of the edges of the inner ring parts and thus result in an additional locking of the parts in an axial direction.

The locking device is very easy to assemble and disassemble. For example, the locking device is slightly deformed so that the side edges are bent toward one another and the lateral dimension is less than the diameter of the bearing bore. It can then be slipped into the bore and released so that it assumes the bowed position illustrated in FIG. 3. The protrusions or ears 16 of the plate engage around the bevelled edges 17 of the inner rings to add the additional locking force in the axial direction. In a case where the plate does not have the bevelled ears and the side edges 14 and 15 are straight, the frictional engagement of these edges in the bore is sufficient to hold the inner rings together. Now when it is desired to install the bearing, the plate is simply flexed to release the side edges from engagement with the bore thereby permitting removal. In cases where the edges are straight, the plate may simply be slid from the bore. In either event it has been found that the locking device may be reused many times. The resiliency of the plate is such that it returns to a flat condition after removal from the bearing bore.

The holding power of the locking device is a function of several variables including the type of material, its cross-sectional configuration and thickness. However, for rectangular plate of a given elastic material and cross section, the holding power in the bearing bore can be controlled by selectively varying the elastic distortion of the plate which is for the most part the main factor in determining the holding power. For example in the form of the invention illustrated in FIG. 3, for small bearings which require a relatively small holding power, the length of the plate may be made only slightly greater than the diameter of the bore so that very little flexure takes place when it is inserted into the bore of the bearing. Thus a short plate with low holding power can be used. For larger bearings, on the other hand where a greater holding power is required, a longer plate with a greater flexure at the angle to the bore of the bearing should be provided as illustrated in FIG. 4.

There is illustrated in FIG. 5 a safety locking device particularly adapted for large and heavy bearings. In these applications, the locking device which is in the form of a rectangular plate is oversized to provide a very great holding power. A plate of this size when bent to fit into the bearing bore assumes the L-shaped configuration illustrated in FIG. 5 and contacts the bore at three circumferentially spaced points, namely at the terminal ends of the angled legs 5 and 6 and also at the vertex 7.

There is illustrated in FIG. 6 another modification of a locking device in accordance with the present invention. This device differs from the previously described embodiments in that the cross section of the plate is structured to be Z-shaped so that the vertices 9 and 10 of the flexures lie close to the bore of the bearing.

Still another embodiment of safety locking device for bearings is illustrated in FIGS. 9 and 10. The plate 11 corresponds essentially to the one shown in FIGS. 7 and 8 in that it is of generally rectangular configuration. However, in this instance the plate does not have the radial projections or ears at the corners but is provided with a central hole or opening 12 which in this case is also of rectangular configuration similar to the peripheral configuration of the plate. Even though one opening is shown, there may be several and the size and shape of the openings may be selectively varied. By reason of providing such an opening or openings in the plate, the flexibility may be controlled further and thereby the holding power.

A further modification of safety locking device for bearings is illustrated in FIG. 11. In this instance the device is of generally rectangular configuration similar to that described previously except that instead of being of a uniform cross section throughout, the plate is of variable thickness and tapers toward its minimum cross section adjacent its central point indicated d'. This arrangement fixes the flex axis of the plate permanently at its minimum cross section.

While the gripping or holding power of the plates 4, 11 and 13 according to FIGS. 1 to 5 and 7 to 11 is controlled by means of a vertex of the flexure which is located adjacent the central axis of the bearing, the holding power of the plate 8 which is of Z-shaped cross section is controlled by means of two vertices 9 and 10. This arrangement has greater holding power and therefore is particularly adapted for large and heavy bearings with split inner rings since the bending point or vertices of the plate is closely adjacent the bore by reason of the Z-shape configuration.

The following are examples of a locking device in accordance with the present invention which have been effective for the purposes intended. With specific reference to the principal embodiment, the length L is preferably about 1% greater than the diameter D of the bore of the inner ring parts. For example, for a bore diameter D of 60 mm, the length L of the plate member 4 without protrusions is about 60.60 mm. The length L' including the protrusions 16 is about 62.10 mm. This relationship is applicable for bearings with a bore diameter of between 40 and 60 mm. For larger bearing diameters, greater than about 75 mm the ratio will increase.

Even though the locking device may be made of a variety of materials, polyoxymethylene (POM) is a material having the desired properties.

While particular embodiments of the present invention have been illustrated and described herein, it is not intended to limit the invention and any changes or modifications may be made therein within the scope of the following claims.

We claim:

1. A locking device for use during shipment and handling of bearings having a split inner race ring with a central bore, comprising a plate member made of a resilient elastically deformable material having good spring characteristics, said plate member being of generally rectangular configuration and of a predetermined size relative to the bore of the inner race ring so that it is clamped in a radial direction by spring action when deformed and inserted in the bore of both portions of the split inner race ring of the bearing and engages the bore with only line contact at selected circumferentially spaced locations for ease of assembly and disassembly.

2. A locking device as claimed in claim 1 wherein said plate member has a length which is greater than the diameter of the bore of the split inner race ring.

3. A locking device as claimed in claim 1 wherein said plate member is provided with at least one hole.

4. A locking device as claimed in claim 1 wherein the thickness of the plate member tapers to a smaller cross-section toward the center thereof.

5. A locking device as claimed in claim 1 wherein said plate member is of an L-shaped cross-section.

6. A locking device as claimed in claim 1 wherein the plate member is of an essentially Z-shaped cross-section.

7. A locking device as claimed in claim 1 wherein said plate member has a width which is multiple of the width of one bearing.

8. A locking device as claimed in claim 1 wherein said plate member has radial protrusions at the ends of the side edges spaced to contact chamfered corners of the outer edges of the inner race ring parts.

9. A locking device as claimed in claim 1 wherein said plate member is of a predetermined size relative to the bore so that it assumes an L-shaped configuration when mounted therein and contacts the bore at three circumferentially spaced locations, one location being the terminal end edge of one of the angled legs, another being the terminal end edge of the other leg and the third contact location being at the vertex.

10. A locking device as claimed in claim 1 wherein the plate member is of a predetermined size relative to the bore so that it assumes a generally V-shaped cross section when installed and engages the bore at its outer terminal edges at diametrically opposed line contact locations and wherein the vertex lies approximately adjacent the center line of the plate offset relative to the central axis of the bore.

* * * * *